(12) United States Patent
Lam

(10) Patent No.: US 7,941,659 B2
(45) Date of Patent: May 10, 2011

(54) EXTERNAL MEMORY ENABLING A USER TO SELECT AN APPLICATION PROGRAM TO BE LAUNCHED BEFORE LAUNCHING AN OPERATING SYSTEM

(76) Inventor: Peter Ar-Fu Lam, Torrance, CA (US)

( * ) Notice: Subject to any disclaimer, the term of this patent is extended or adjusted under 35 U.S.C. 154(b) by 767 days.

(21) Appl. No.: 11/981,958

(22) Filed: Oct. 31, 2007

(65) Prior Publication Data

US 2008/0082816 A1    Apr. 3, 2008

Related U.S. Application Data

(63) Continuation-in-part of application No. 10/429,645, filed on May 5, 2003, now Pat. No. 7,822,962.

(51) Int. Cl.
- G06F 15/177 (2006.01)
- G06F 9/24 (2006.01)
- G06F 9/00 (2006.01)

(52) U.S. Cl. .................. 713/2; 713/1; 713/100

(58) Field of Classification Search ......... 713/2
See application file for complete search history.

(56) References Cited

U.S. PATENT DOCUMENTS

| | | | | |
|---|---|---|---|---|
| 6,367,074 | B1 * | 4/2002 | Bates et al. | 711/170 |
| 6,519,659 | B1 * | 2/2003 | Stevens | 710/15 |
| 6,564,318 | B1 * | 5/2003 | Gharda et al. | 713/2 |
| 6,766,478 | B2 * | 7/2004 | Leung | 714/42 |
| 6,791,572 | B1 * | 9/2004 | Cloney et al. | 345/619 |
| 6,839,836 | B2 * | 1/2005 | Cole et al. | 713/2 |
| 6,976,172 | B2 * | 12/2005 | Girard | 713/193 |
| 7,082,526 | B2 * | 7/2006 | Chang | 713/2 |
| 7,107,441 | B2 * | 9/2006 | Zimmer et al. | 713/1 |
| 7,401,249 | B2 * | 7/2008 | Zhang | 714/5 |
| 2002/0068988 | A1 * | 6/2002 | Chan et al. | 700/94 |
| 2002/0077713 | A1 * | 6/2002 | Du et al. | 700/94 |
| 2003/0060911 | A1 * | 3/2003 | Chan et al. | 700/94 |
| 2003/0093659 | A1 * | 5/2003 | Wen et al. | 713/1 |
| 2003/0187775 | A1 * | 10/2003 | Du et al. | 705/37 |
| 2003/0188144 | A1 * | 10/2003 | Du et al. | 713/1 |

* cited by examiner

Primary Examiner — Suresh K Suryawanshi

(57) ABSTRACT

An application program is provided to work with two operating systems of a computer. A first mode of the application program is configured to work with the computer before the primary operating system is booted. The second mode of the application program is provided to work under the environment provide by the primary operation system.

21 Claims, 5 Drawing Sheets

EXTERNAL MEMORY ENABLING A USER TO SELECT AN APPLICATION PROGRAM TO BE LAUNCHED BEFORE LAUNCHING AN OPERATING SYSTEM

This is a continuation in part application of U.S. patent application Ser. No. 10/429,645 filed May 5, 2003, now issued as U.S. Pat. No. 7,822,962.

FIELD OF THE INVENTION

The present invention relates to a method that provides an application program for working with two operating systems of a computer. The application program is configured to work with the computer before the primary operating system is booted.

BACKGROUND OF THE INVENTION

The present invention relates generally to a method allowing a computer to run an application program before the operation system of the computer is booted.

Traditional computer booting sequence starts at running the instructions stored at a BIOS storage device. After the BIOS is booted, the computer is instructed to run the operating system, represented by the term OS. The commonly used OS such as different versions of the Microsoft Windows takes around one to two minutes to boot the computer. When a computer is to be turned off, the OS takes another ten to thirty seconds to turn off the computer. The booting time and shut down time of the OS, although acceptable to most desktop computer working environments, are less tolerable for notebook computer users, especially when the computer is utilized as a real paper notebook, just for retrieving a telephone number, check the time of an appointment, or to drop down some notes.

It is the objective of this invention to provide a computer system capable of accessing personalized application program prior to the booting process of the computer OS.

SUMMARY OF THE INVENTION

Traditional booting sequence to power up a computer starts with running the instructions stored at a BIOS storage device. Typical BIOS storage device are represented by solid-state non-volatile memory or SRAM memory back up by battery power. A common type of memory used for computer BIOS is flash memory due to the nonvolatile nature of this technology even after power is removed. After the BIOS is booted, the computer is instructed to run the operating system, represented by the term OS. The OS of a computer is provided to set up all the interfacing settings of the hardware and software key components connected to the computer. The OS also defines the default parameters of the computer when power is turned on or when the computer is reset. Technically it is possible to provide a big BIOS for performing many important functions of the OS. However, the cost per mega byte of data of solid-state nonvolatile memory is very expensive as compared with the memory cost of hard disk drives. Accordingly BIOS is usually designed to occupy very small memory size just adequate to store simple programming instructions for the computer to start running the OS. Most of the lengthy start up programs are performed by the OS.

The are many different OS systems available in the market. The most common OS available in the market for personal computer is the Microsoft Windows. Different versions of Windows required one to two minutes of booting time depending on the speed of the hard drive, speed of the processor and the number of supporting hardware and software installed. When a computer is shut down, the OS may take another 10 to 30 seconds to update the data and update the configuration information before closing the running programs. The booting time and shut down time is not causing significant problems to users of desktop computers. This is because the power supply of most desktop computers are left on or turned on/off only once a day. As notebook computers are getting lighter in weight, more and more notebook computers are installed with software servicing daily activities such as appointment schedulers, telephone directories, diary, note pad and many other personalized application programs. All these software servicing the daily activities of a person are collectively termed as personalized application program. Another characteristic of personalized application program is that the information stored, or retrieved are real personalized information. The broader term application program is defined to include any software servicing specific applications, requiring the support of a computer, including but not limiting to word processors and spreadsheets. It should be noted that according to this definition, the definition of application program does not include any software provided mainly to service the computer, such as to test the functions of a computer, virus scan or to configure the settings of a computer. In many actual notebook applications, an user accesses the computer only for simple information previously stored in paper notebooks, such as to retrieve a phone number, check appointments, or to write down some simple messages. The time required for these kinds of application process takes around two to ten seconds. The one to two minutes of booting time acceptable to the application of desktop computers is just too long for many simple notebook applications. It is the objective of this invention to provide a computer system capable of accessing personalized application program prior to the booting process of the computer OS, so that users are able to access data stored in the notebook computer instantly. Application programs are also classified according to the environments where they work. Pre-OS application programs are defined to be application programs working in the pre-OS environment, before a primary OS is booted. Primary OS, or simply OS application programs are defined as application programs suitable for working in the primary OS environment. Primary OS application programs will not work in the more primitive pre-OS environment. On the contrary, it is possible to configure pre-OS application program to work in primary OS environment. It is also a desire of this invention to provide a special form of dual modes application programs. A simple, fast to run application program is configured to run only in the pre-OS environment. At the same time, another application program offering at least the similar functions of the simple, fast to run application program is added with enhancements for running in the more luxury primary OS environment. This enriched, or enhanced application program to run is a primary OS environment is defined as a imaging application program of the corresponding primitive version of the pre-OS application program. When a pre-OS application and a corresponding image application program are bundled for selling to a customer, it is usually desirable to include a synchronizing program to synchronize the application data of the pre-OS application program and that of the primary OS application program, unless these application programs share the same data file. Application data is defined as the user data generated when the user works with an application program. Although application program are usually stored in the hard disk of a computer, in a preferred embodiment, a pre-OS application program is stored in an external memory means. The advantage is that the user will be able to work with the user program on any computer. A external memory means may also be connected with a computer before it is powered up. Upon power up, the computer detects the presence of the pre-OS application program of the external memory means and proceed to boot the pre-OS working environment. Application data of pre-OS application programs are preferred to be stored in the external memory means so as to enhance security control of the application data.

The major difficulty in providing speedy access of application program before fully booting a computer is that the OS actually is required to set up the computer before full-featured application program can be run. For example, before an OS is booted, the computer may not be able to response to mouse or touch pad movements. The computer screen is set at the lowest resolution available. Modem and network card access are not available. Other communication ports such as the serial port, parallel port, infrared port and the popular USB port are not accessible. Audio function is not ready. Many of these basic functions are not available, not to mention the advanced features provided by the latest Windows and Apple OS.

Close research of different notebook using habits reveals that over 90 percent of the task performed by the OS, although preferable, are not necessary to perform the personalized applications defined by this research. A lot of features can be compromised in exchange of the convenience of quick access to the personalized applications. In a first application embodiment, a personalized telephone directory program can be provided to work at VGA resolution, a low 8 bit color setting, no sound capability and without accessibility to any external communication ports. The next step is to run the application program before booting the OS.

Different methods had been studied to enable running personalized application program before booting an OS. The first method is to provide a compact application program in a removable diskette. Most BIOS of notebook computer enables the computer to access a boot up diskette before booting the OS. This feature was provided to obtain start up control of the computer in case the OS is corrupted. When the computer is to be normally booted, the diskette containing the application program is removed from the diskette drive. When quick access to the personalized application program is required, the diskette containing the software is inserted into the diskette drive before power is turned on. Several difficulties had been discovered during the research of this direction. Firstly most notebook computers provide only a floppy diskette drive. The 1.44 M memory capacity of the floppy diskette is too small for a reasonable application program. This capacity is also too small for storing the personalized data. Secondly, there is an increasing trend that new notebook computers are provided with a CD drive instead of a floppy drive. Even though the capacity of CD drive is high enough for most personalized programs, it is not suitable for this invented application because the personalized data cannot be stored on a regular CD. Although CD R/W is capable of storing user data, it is also not perfect for this application because the CD is easy to be scratched. It is less reliable and difficult to handle as compare with a floppy diskette. In addition, the speed of a CD R/W is too slow especially in writing mode. Higher capacity Zip drive is perfect for this solution. Unfortunately the Zip drives, although popular, was not able to replace the floppy diskette drive to have a widely accepted installed base in notebook computers.

Another approach tried in the research is to modify the BIOS for setting up a removable external miniature drive so that this drive can be accessed before the OS is booted. Portability and durability of the external drive is important. Accordingly, any electronics devices not configured to provide memory storage for computer data as it's major field of service, such as portable DVD player, digital picture frames, cell phones, digital cameras, scanners, iPOD are excluded from the definition of external memory means. Two different kinds of devices are qualified in the search for suitable products to be used to provide a suitable embodiment of the invention. They are the miniature portable hard drives and solid-state flash memory devices that make use of the PCM-CIA slot, fire-wire or USB ports of the computer.

Another method to access a personalized application program before booting an OS is to modify the BIOS such that it is responsive to certain hot keys on the keyboard during power up. When a key is depressed during the power up period, the computer is directed to a personalized application program installed in the hard drive.

Many users and computer manufacturers may feel hesitate to modify content of the BIOS as it is difficult to handle and may cause serious problems very difficult to be fixed. Accordingly another solution is obtained from the research. A control program is provided in an external memory means that directs the computer to run an application program of the computer.

Alternately the control program can be stored inside the hard drive of the computer. The BIOS is provided with instructions to access the control program before starting to boot the primary OS. The control program may be configured to detect hot keys before or during the booting sequence. Alternately the control program may help to define the functions of the hot keys, or the keys of the computer keyboard, so as for a user to decide which application program to be launched after the booting process. The control program may also provide a screen to prompt the user to decide which personalized startup application program to be selected or to proceed for booting the primary OS.

The very primitive setup of the computer before booting the OS may be too limiting for some personalized application program. For example, the resolution of the screen may be desirable to be enhanced for better displaying pictures or a spreadsheet. Accordingly the application program or the control program previously discussed may comprise codes to set up the display screen to provide more colors or higher display resolution. The process of setting up a better working environment is actually part of the job of the full feature primary OS of the computer. Providing some fast set up and configuration task simpler than the primary OS for quickly supporting the personalized application program is defined as the task of a pre-OS. The primary OS, or simply OS is defined as the full-featured OS normally operated by a computer such as Windows. It should be noted that the computer may comprise only the primary OS if a pre-OS does not exist. It should also be noted that a consolidated OS may be designed to provide the functions of both the pre-OS and the primary OS; in this case the consolidated OS may also be termed as a primary OS or simply the OS of the computer system.

Another further objective of the invention is to provide a computer system suitable for the user to access the personalized application programs both before the OS booting process and also during the normal operation mode after the OS is booted. For an example, it is desirable to provide an application program that allows a user to input some notes with a primitive notebook application program without booting the OS, and at a later time, using a full feature word processing software to copy or edit the message entered. Since the working environment is very primitive and many supporting devices are not ready before the OS is booted, features of the personalized software offered under this working condition will be difficult to match with the full features working under the OS environment. Different ways had been studied to configure the application program to work under this dual mode environment. The first way is to provide two different application programs, one to work in the pre-OS environment and one to work under the OS, or primary OS environment, such as Windows. These different programs may share some common parts, such as the subprograms and the shared data files. Although the two application programs are configured to work under different environments, they can be bundled under one brand or under one package for marketing purposes. The two programs can be packaged as a single software program, comprising a subprogram for use in the pre-OS environment. Assuming the application program working under the OS provides n application functions, or objectives, a portion of the software, or a parallel program can be provided to service applications functions under the pre-OS environment, where m is smaller than n. In most situations, the functions offered in the pre-OS environment is a subset of the full-featured software program, comprising functions selected from the full-featured software working under the primary OS environment. An application program packaged to work under both the pre-OS and primary OS environments is defined to be a dual mode application program. Dual mode application program may comprise two different application programs, one working in a pre primary OS environment and the other one working in a post primary OS environment. Dual mode application program may also be represented by a single program, capable to adjust itself to work under both the pre-OS and primary OS environments. It should be noted that a program working under a simulated pre-OS environment generated in a primary OS environment cannot be qualified to be a dual mode application program. This is because the program is actually not design to work with the improved features provided by the primary OS environment. A screen may also be provided at the early time of the process to prompt the user if the primary OS is to be booted at a background when the pre-OS application program is being utilized. When a user is working on a pre-OS application program under a pre-OS environment and the system is booting into the primary OS environment, a decision is to be made—how to handle the pre-OS application program that the user was working on? Three results had been achieved according to the research study of this invention. The first approach is to transport the pre-OS application software, or loading the corresponding image version of the pre-OS application software into the primary OS environment. The disadvantage of this embodiment is that the application program will not be able to enjoy the deluxe enhanced features of the primary OS environment. An alternate second solution is to automatically load the corresponding image application program into the primary OS environment, plugging in all the data previously entered or loaded by the user. A third approach is to give the user a prompt and control means, such as a key or an icon on the screen, for the user to switch from the pre-OS application program into the primary OS application program when the time is appropriate.

Other than the functional features, transparency of data file in front of the user is very important. The user is desirable be able to access the data files entered in any of the two application environments. The optimal design is to provide data file common to the programs working in both the pre-OS and primary OS environments. If this is difficult for some applications, a set of two data files, each design for their respective working environment can be designed. A synchronizing program is required to update the pair of data files so that the data contents are consistent in the two files. In a preferred embodiment, the pre-OS application data file is stored in an external memory means. The post OS data file is stored in the hard drive. In another preferred embodiment, the pre-OS data file comprises the basic, small size data information required by the pre-OS application program. The post OS data file comprises more detail extended information, such as facial picture files for supporting a telephone directory program provided by a full-featured application program. Another advantage was discovered when the shared data file is stored in a removable storage device. The storage device can be removed or access prohibited before the computer is connected to the internet such that the confidential data will not be accessible by hackers.

Another objective of the invention is to provide the users multiple startup programs and the choice of which personalized to be launched after running the BIOS. An embodiment of this application is to provide different hot keys each represent a personalized application program to be launched right after completing the BIOS. For example entering the "N" key during the power up process will launch a note pad. Entering the "D" key will launch a directory program. Entering the "W" key will launch a word processing program.

The present invention is also directed to the inventive steps of providing the user a feature to continue booting the primary OS while the user is working on a startup pre-OS version of the application program. It means the computer continue to boot the OS after the application program is launched. The pre-OS environment may be configured to provide a choice, for a user to decide if he/she wishes to boot from the pre-OS environment into a primary OS environment. As soon as OS booting sequence is completed, the primary OS will take over the control. A preferred feature offered in the research is for the OS to automatically launch the full version of the application program. The OS may also be configured to automatically switch over the application program from the pre-OS version to the primary OS version. In this process, the primary OS can be configured to comprise a secondary OS portion, which allows the user to instantly launch the reduced version of the application program under the secondary OS environment while the full version of the primary OS is being booted. The feature for the computer to continue booting at the background may be offered as an optional feature. This is because some users may just want to momentarily access the start up application programs and then turn the power off. They may not want to spend the time waiting for the primary OS to power down.

The novel features of the invention are set forth with particularly in the appended claims. The invention will be best understood from the following description when read in conjunction with the accompanying drawings.

BRIEF DESCRIPTION OF DRAWINGS

FIG. 3 is a flow chart illustrating the sequence when a prior art computer is reset or when power is turned on;

DESCRIPTION OF THE PREFERRED EMBODIMENTS

Figure 1:
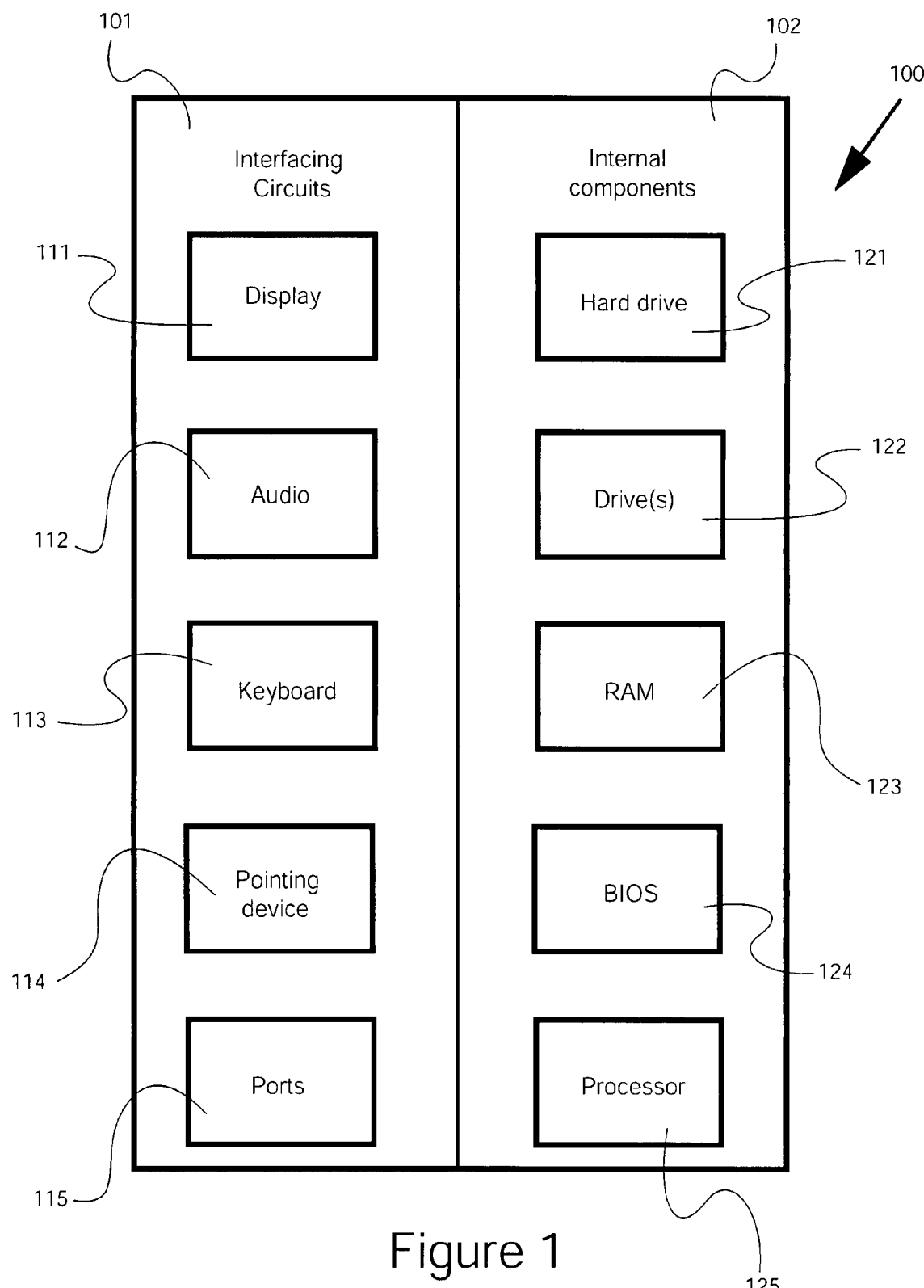
FIG. 1 illustrates the block diagram structure of an embodiment of a notebook computer.

Attention is initially directed to FIG. 1, which depicts the block diagram structure of a prior art personal computer. The computer 100 comprises of interfacing circuits 101 and internal components 102. Interfacing circuits are defined by the components provided to interface between the internal components of the computer with the user or the external environment. Typical interfacing circuits includes the display unit 111, a screen to display information for the user; the audio circuit 112 for providing audio output; the keyboard 113 for entering alpha numeric information; pointing devices 114 represented by mouse, track ball and touch pad sensors. The ports 115 include all different kinds of communication interfaces such as USB port, fire wire port, serial and parallel ports, network port and modem. The internal components 102 of a computer comprise an internal hard drive 121 provided for storing OS, programs and data. Drives 122 are provided to accept external storage media. Typical external media accepted by the drives 122 are magnetic diskettes and optical disks. Some add on flash memory modules are marketed as solid state drives. In addition to the internal hard drive, the computer requires faster internal solid state memory 123 for providing higher speed operation. BIOS is represented by battery back up memory or flash memory storing the instruction set to be run upon power up or resetting the computer. The core of the computer is a high speed processor 125 which is sometime named as a CPU. When the power of the computer is turned on, the processor 125 fetches instructions from the BIOS 124 which setup the primary configuration of the computer. Then the computer is directed to initiate programs stored inside the hard drive 121. The operation system, also commonly referred as the OS stored in the hard drive 121 further set up the hardware and software configurations of the computer. After the OS is booted, application programs stored inside the hard drive 121 can be launched to service the needs of the users. In order to take over the control of the computer just in case a crash occurs, the BIOS 124 may instruct the computer to look at the external drive 122 for initial program before proceeding to launch the OS from the hard drive 121.

Figure 2:
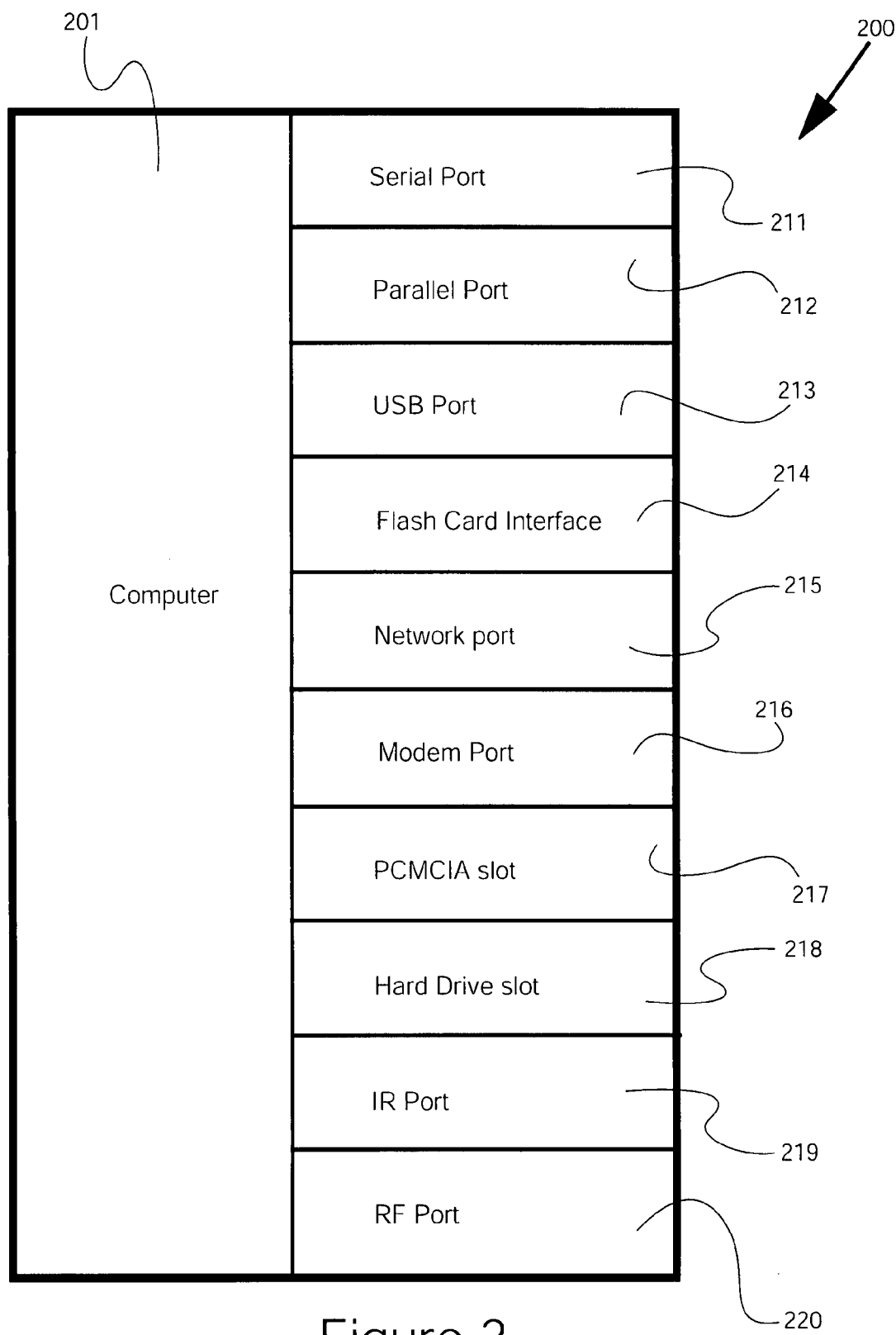
FIG. 2 illustrates the typical ports enabling a computer to communicate with external devices.

FIG. 2 illustrates the communication ports provided to a typical computer. Serial port 211 and parallel port 212 enable the computer to communicate with external devices such as printers. USB port 213 is another universal serial communication interface that provides limited power to the external devices. New computers may also provide interface connector 214 for connection with flash memory modules such as compact flash, smart media or memory stick. Network port 215 and modem port 216 enable the computer to communicate with external network. PCMCIA slot 217 is a standard interface port providing power and high speed interface for notebook computers to connect with miniature slim size devices such as network card or miniature drives. Some desk top computer may provide extra hard drive slot 218 connecting an external hard drive to the computer. IR port 219 and RF port 220 are provided for the computer to communicate with external devices without a cable. Blue tooth and WiFi are common RF standards used for note book computer.

Figure 3:
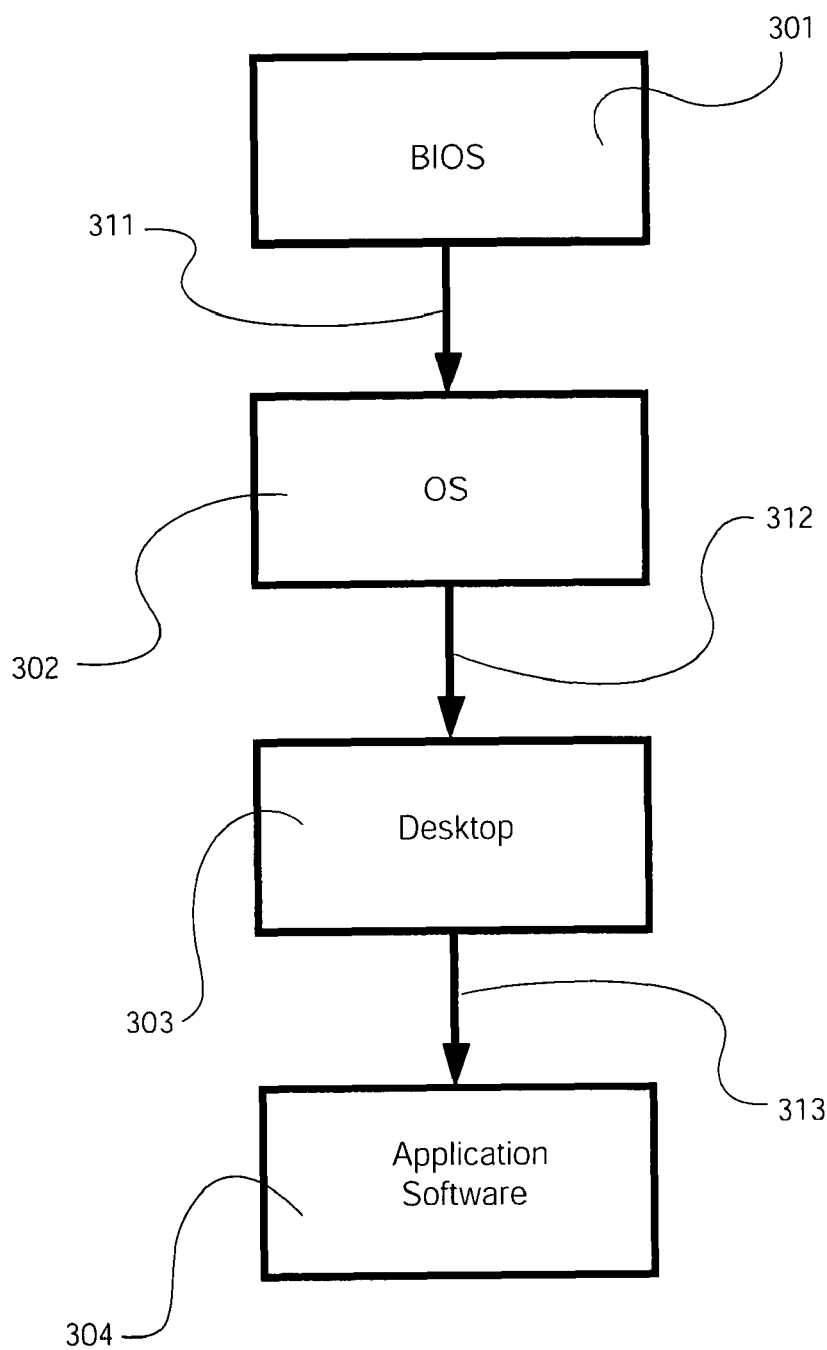

FIG. 3 demonstrates the booting sequence of a typical computer. Programs instructions stored inside the BIOS memory 301 are executed by the CPU when the power of the computer is turned on. After setting up the primitive configurations of the computer such as the video display and the keyboard, the computer starts to boot the operation system 302 which is also referred as the OS of the computer. When Windows or Apple OS are booted, the OS provides a desktop, which enables user to access different application program 304 by clicking the short cut icons displayed on the desktop screen.

Figure 4:
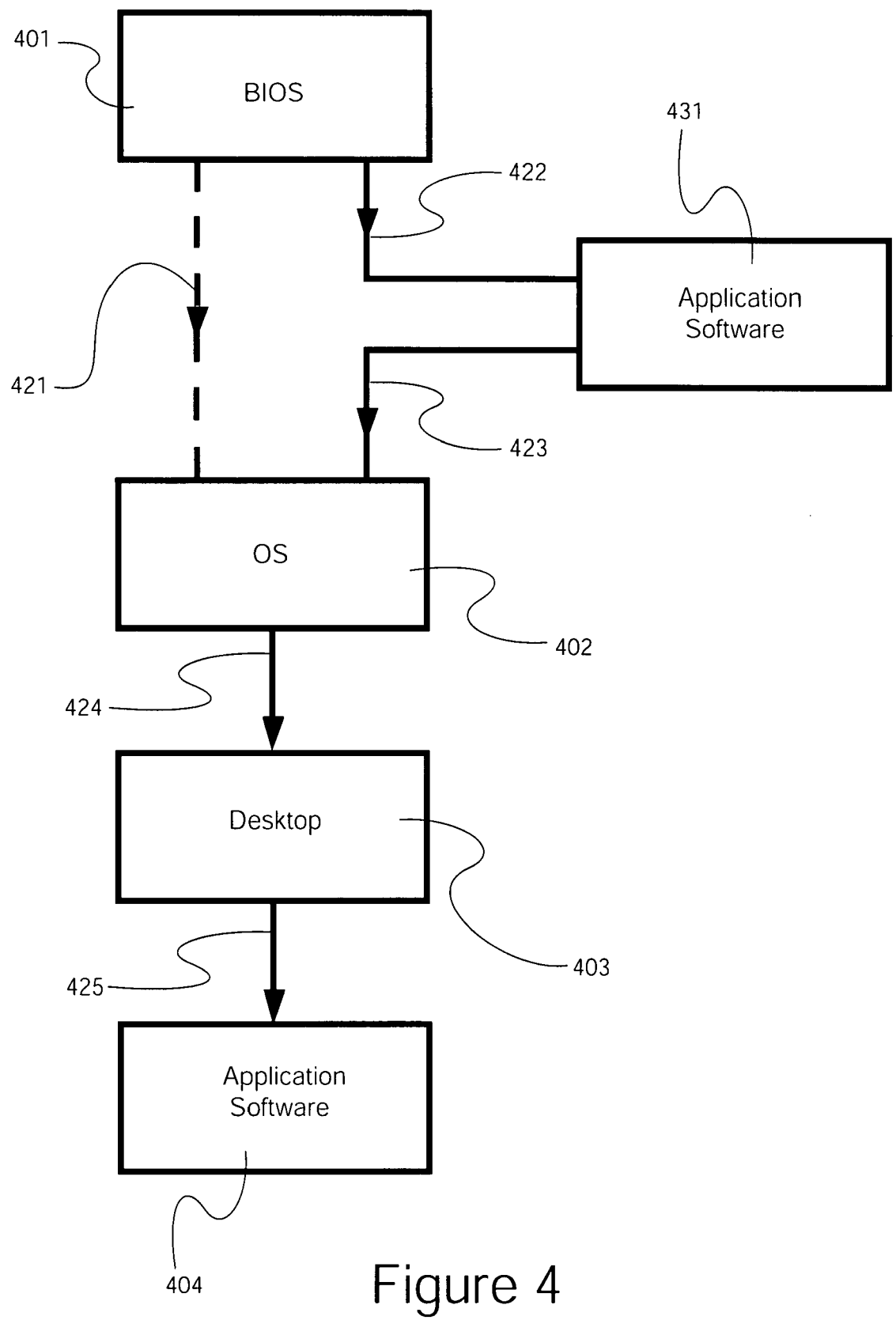
FIG. 4 illustrates the introduction of startup application program into a booting sequence.

Attention is now drawn to FIG. 4, which illustrates the flow chart for a computer to access an application program 431 after executing the instructions stored in the BIOS memory 401. Since the BIOS 401 only provides very primitive setup of the computer, this pre-OS environment provides limited features for the pre-OS application program 431. Accordingly the application program may include a primitive but improved pre-OS for enriching the support of the application program 431. The mechanism to initiate the path 422 can be achieved by modifying the content of the BIOS, or by providing another initialization program stored on a diskette, which directs the computer to set up the secondary OS or to launch the application program 431 before booting the primary OS 402. When a user is working on the application program 431, the computer may continue to boot the primary OS 402 at the background. After the primary OS is booted, the computer launches the desktop and the full-featured application program 404 for replacing the primitive pre-OS version of the application program 431. It should be noted that the path 423 and 421 may be provided as an option because many users may only want to have a brief access to the application program 431 before turning off the computer.

Figure 5:
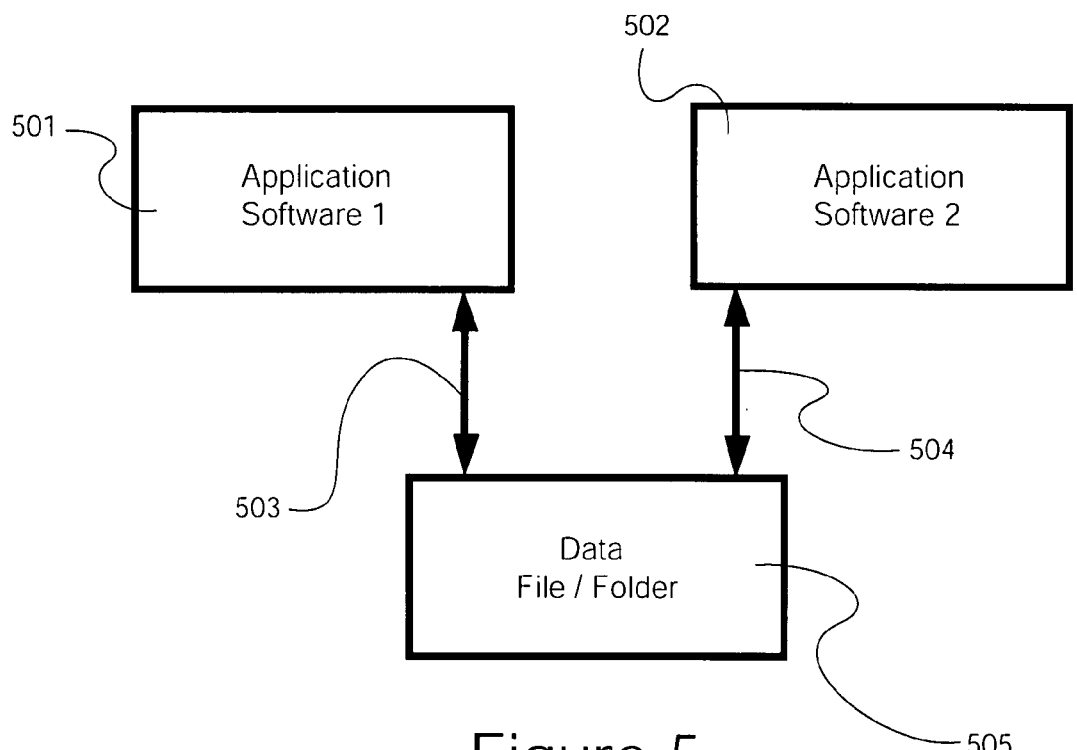
FIG. 5 illustrates one structure of dual mode application program.

The primitive pre-OS version of the application program 431 and the full featured application program may be derived from two different programs, or from a packaged software providing services in both the pre and post OS environments. The pre-OS application program may be designed to provide some major functions of the full-featured application program 404. In order for the application program 431 to be smoothly transformed over to 404, a dual mode application program comprising both the application programs 431 and 404 is design to provide a common data file 505 as illustrated in FIG. 5. Pre-OS application program represented by the block 501 of FIGS. 5 and 431 of FIG. 4 is configured to access the data file 505. After the post OS full feature application program 502 of FIG. 5 or 404 of FIG. 4 takes over the control, the full features application program may also obtain access to the common data file 505.

Figure 6:
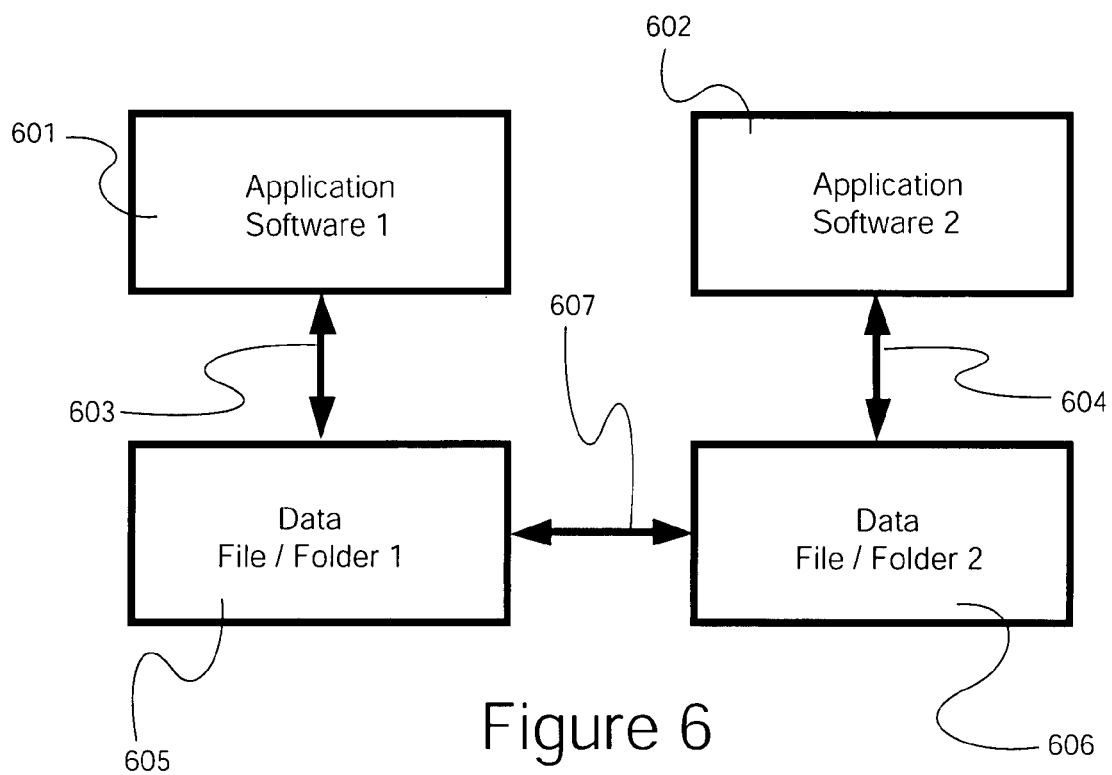
FIG. 6 illustrates another structure of dual mode application program.

Due to technical constrains, sometimes it is preferable to provide different data files to each of the pre-OS and primary OS application program as illustrated in FIG. 6. For example the data file 605 managed by the pre-OS application program 601 provides only the basic data information for the user. The data file 606 may provide additional imaged data information not available from the file 605, for accessing by the post OS application program. Although the data file 605 and 606 are designed basically to store the similar type of information, the data file 606 may provide extended information about the application less desirable to be accessed by the pre-OS application program 601. An example of the extended information to be stored in the file 606 but not in the file 605 are graphical information of large file size. In order to maintain the consistency of data retrieved in both the pre-OS and primary OS modes, the data files of the dual mode application program is to be synchronized as shown in the step 607 when the operation is switching from one mode to another.

Another reason to support the structure of FIG. 6 is that sometimes both the pre-OS application program and the corresponding application data file are stored in an external memory means. Since these devices provide limited memory capacity, the data file 605 should be of smaller size as compared with the extended data file 606 stored in the hard drive 121 of FIG. 1.

Although detailed background of the invention have been disclosed, it is recognized that variations and modifications, such as modifying the terms used in the specification, or repackaging the programs in a software package according to marketing needs. It is accordingly intended that all such variations and modifications be encompassed by the appended claims.

What is claimed is:

1. A method for a user to operate a computer comprising the steps of:
    (1) running a basic input output system (BIOS);
    (2) providing at least a first and a second application program; and
    (3) providing external memory means enable said user to select an application program to be launched before launching any operating system (OS) of said computer.

2. The method of claim 1 wherein said external memory means stored a control program configured for selecting an application program to be launched in step (3).

3. The method of claim 2 wherein said control program enables a user to select said application program to be launched by initiating a key of said computer.

4. The method of claim 1 wherein said first and second application program are pre-OS application program configured to run in a pre-OS environment before the OS of said computer is launched.

5. The method of claim 4 further providing a step to continue booting said OS while running said application program in said pre-OS environment.

6. The method of claim 4 wherein said computer is configured to allow said user to decide during said pre-OS environment if said OS is to be launched.

7. The method of claim 1 wherein said first and second application program are configured to run after the OS of said computer is launched.

8. The method of claim 1 wherein said first and second application program are configured to run during booting the OS of said computer.

9. The method of claim 1 wherein at least one of said application programs resides in said external memory means.

10. The method of claim 1 wherein the application data derived from running any of said application program resides in said external memory means.

11. The method of claim 9 further comprising a step to provide a program configured to synchronize said application data with one or more data files stored in said computer.

12. A method for a user to operate a personal computer comprising the steps of:
    (1) providing multiple application programs;
    (2) providing hot keys for enabling an user to select any one of said application programs to run in a pre-OS environment or an OS environment prior to launching any of said pre-OS or OS environments; and
    (3) launching the selected application program of step (2) according to the selection of said hot keys after said pre-OS or OS is booted.

13. The method of claim 12 further comprising the step of:
    (4) connecting an external memory means to said computer prior to powering up of said computer; wherein said external memory means comprises codes to help defining the nature of said hot keys.

14. The method of claim 13 wherein said external memory means stores codes representing at least one of said application programs.

15. The method of claim 13 wherein said external memory means stores application data of at least one of said application programs.

16. The method of claim 12 further comprising the step of:
    (4) providing a step allowing said user to work in said pre-OS environment and to boot to said OS environment from said pre-OS environment.

17. A method for a user to operate a personal computer comprising the steps of:
    (1) providing a first pre-OS application program in an external memory means;
    (2) prior to booting said computer, connecting said external memory means with said computer;
    (3) configuring said computer to detect the presence of said external memory means prior to booting said computer to said pre-OS or OS environments;
    (4) when the presence of said external memory means is detected, booting said computer to said pre-OS environment to run said first pre-OS application program;
    (5) configuring a second imaging application program to provide enhanced features of said first pre-OS application program;
    (6) installing said second imaging application program to reside inside the internal memory of said computer; and
    (7) booting said computer to a OS environment to run said second imaging application program.

18. The method of claim 17 further comprising the step of:
    (8) storing application data of said first pre-OS application program in said external memory means.

19. The method of claim 18 further comprising the step of:
    (9) storing application data of said second imaging application program in a computer readable medium located inside said computer, and
    (10) synchronizing the application data of said external means with the application data stored in the computer readable medium of step (9).

20. The method of claim 17 further comprising the step of:
    (8) providing a step to allow said user working in said pre-OS environment to boot to said OS environment.

21. The method of claim 20 further comprising the step of:
    (9) providing a step to convert said first pre-OS application program to said second imaging application program when said computer is booted from said pre-OS environment into said OS environment.

* * * * *